US010737385B2

(12) United States Patent
Shibasaki et al.

(10) Patent No.: US 10,737,385 B2
(45) Date of Patent: Aug. 11, 2020

(54) MACHINE LEARNING DEVICE, ROBOT SYSTEM, AND MACHINE LEARNING METHOD

(71) Applicant: FANUC CORPORATION, Minamitsuru-gun, Yamanashi (JP)

(72) Inventors: Yasuhiro Shibasaki, Yamanashi (JP); Yuta Namiki, Yamanashi (JP); Hiromitsu Takahashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 93 days.

(21) Appl. No.: 16/117,518

(22) Filed: Aug. 30, 2018

(65) Prior Publication Data
US 2019/0077015 A1   Mar. 14, 2019

(30) Foreign Application Priority Data

Sep. 12, 2017 (JP) ................................ 2017-174827

(51) Int. Cl.
*B25J 13/02* (2006.01)
*B25J 9/16* (2006.01)
(52) U.S. Cl.
CPC ............ *B25J 9/163* (2013.01); *B25J 9/1612* (2013.01); *B25J 9/1697* (2013.01); *G05B 2219/39543* (2013.01)
(58) Field of Classification Search
CPC . B25J 9/163; B25J 9/1697; B25J 9/162; B25J 19/02; B25J 9/161; G06T 7/55;
(Continued)

(56) References Cited

U.S. PATENT DOCUMENTS 10,058,995 B1 * 8/2018 Sampedro .............. B25J 9/0084
2010/0094786 A1 * 4/2010 Gupta ..................... G06N 20/00
706/12
(Continued)

FOREIGN PATENT DOCUMENTS

JP          3-88683         9/1991
JP          5-50389         3/1993
(Continued)

OTHER PUBLICATIONS

Notice of Reasons for Refusal dated Jul. 30, 2019 in corresponding Japanese Patent Application No. 2017-174827, with machine translation.

*Primary Examiner* — Dalena Tran
(74) *Attorney, Agent, or Firm* — Wenderoth, Lind & Ponack, L.L.P.

(57) ABSTRACT

A hand for transferring a transfer target can be selected even when the combination of the transfer target and the hand is not taught. A machine learning device includes: state observation means for acquiring at least a portion of image data obtained by imaging a transfer target as input data; label acquisition means for acquiring information related to grasping means attached to a robot for transferring the transfer target as a label; and learning means for performing supervised learning using a set of the input data acquired by the state observation means and the label acquired by the label acquisition means as teacher data to construct a learning model that outputs information related to the grasping means appropriate for the transferring.

11 Claims, 7 Drawing Sheets

(58) Field of Classification Search
CPC ........ G06T 7/60; Y10S 901/01; Y10S 901/03;
Y10S 901/47; G05B 47/46; G05B 61/00;
G05B 2219/40543; G05B 2219/36184;
G05B 13/0265; G05B 2219/39543
USPC .......................... 700/245, 250, 257; 901/1, 3
See application file for complete search history.

(56) References Cited

U.S. PATENT DOCUMENTS

2012/0298706 A1   11/2012   Gordon et al.
2017/0252924 A1*   9/2017   Vijayanarasimhan ......................
B25J 9/1697

FOREIGN PATENT DOCUMENTS

| JP | 10-161730   | 6/1998  |
|----|-------------|---------|
| JP | 11-114857   | 4/1999  |
| JP | 2009-119589 | 6/2009  |
| JP | 2009-172685 | 8/2009  |
| JP | 2013-43271  | 3/2013  |
| JP | 2015-100866 | 6/2015  |
| JP | 2016-132086 | 7/2016  |
| JP | 2016-203293 | 12/2016 |
| JP | 2017-64910  | 4/2017  |
| WO | 2015/178377 | 11/2015 |

* cited by examiner

| | WORKPIECES HAVE FIXED FORM | | FORM OF WORKPIECE VARIES FROM ONE TO ANOTHER |
| --- | --- | --- | --- |
| | (A) | (B) | (C) |
| WORKPIECE |  |  |  |
| |  |  |  |
| HAND |  |  |  |

<INPUT DATA (TRANSFER TARGET IMAGE DATA)>

<CROSS-SECTIONAL IMAGE OF STATE WHERE WORK IS GRASPED BY HAND>

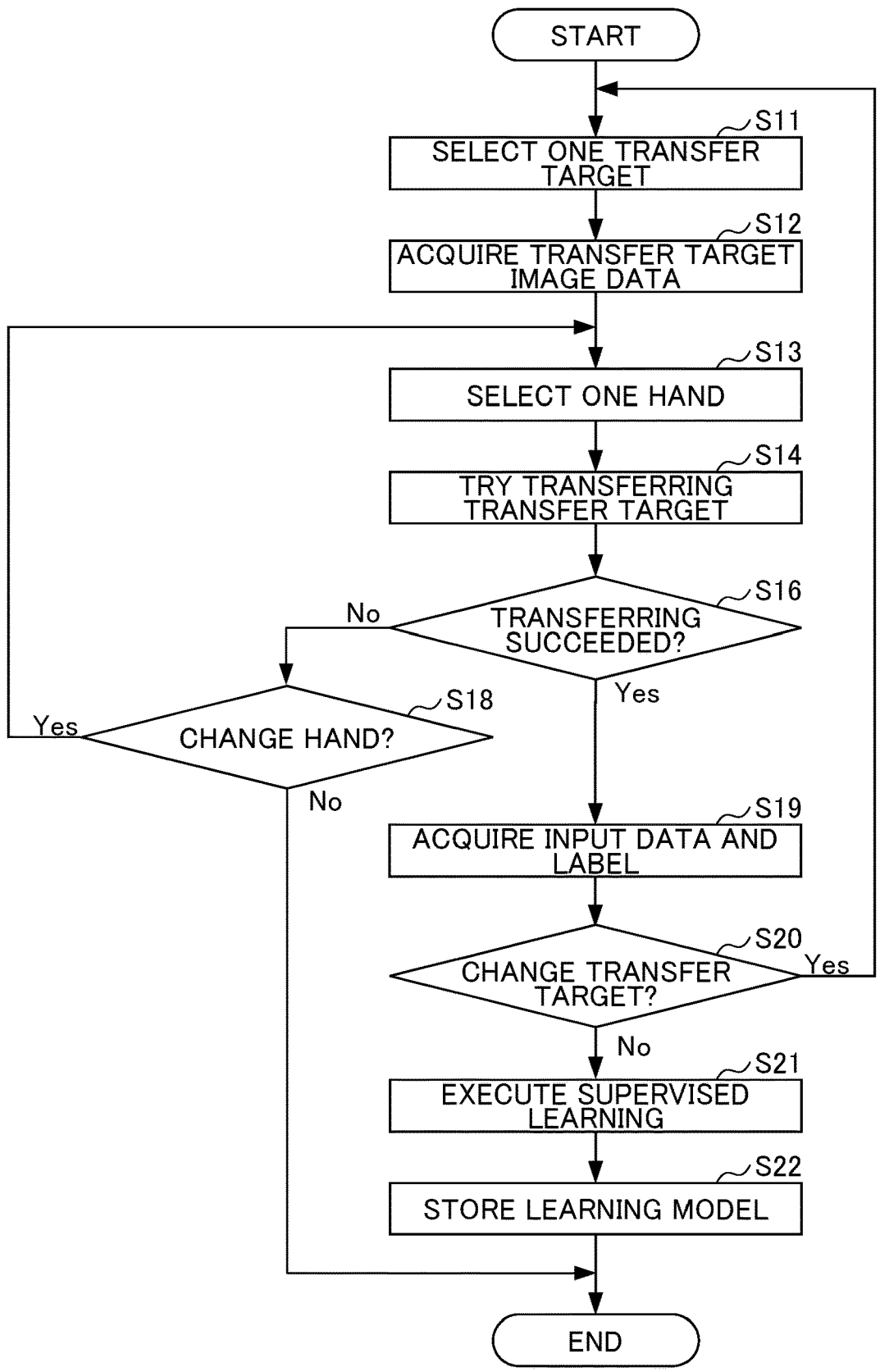

MACHINE LEARNING DEVICE, ROBOT SYSTEM, AND MACHINE LEARNING METHOD

This application is based on and claims the benefit of priority from Japanese Patent Application No. 2017-174827, filed on 12 Sep. 2017, the content of which is incorporated herein by reference.

BACKGROUND OF THE INVENTION

Field of the Invention

The present invention relates to a machine learning device, a robot system, and a machine learning method for performing machine learning on transfer of workpieces by a robot.

Related Art

In a plant or the like, a robot grasps a workpiece with a hand attached to the robot and transfers the workpiece. When a workpiece is transferred by a robot, it is necessary to select a hand having appropriate specifications according to features of the workpiece such as a shape, a weight, and a material of the workpiece. A technique for assisting in selecting a hand is disclosed in Patent Documents 1 and 2, for example.

Patent Document 1 discloses a technique of selecting a hand to be used on the basis of shape data of a workpiece to be transferred and teaching the position at which the hand grasps the workpiece on the basis of the data of the selected hand and the data of the workpiece to be transferred. Patent Document 2 discloses a technique of allowing an automatic transfer device which can be provided in a wafer cassette or the like to automatically select a hand by providing data that stores the relationship between a transfer target object and a plurality of types of hands corresponding to the transfer target object to a control mechanism.

Patent Document 1: Japanese Unexamined Patent Application, Publication No. 2009-119589

Patent Document 2: Japanese Unexamined Patent Application, Publication No. H11-114857

SUMMARY OF THE INVENTION

In the techniques disclosed in Patent Documents 1 and 2 and the like, form data of a workpiece indicating the shape and the size of the workpiece is taught in advance in association with a hand to be used for transferring the workpiece so that the hand can be selected. An example of this teaching will be described with reference to FIG. 1. FIG. 1 is a diagram schematically illustrating the correspondence between a transfer target workpiece and a hand to be used for transferring the workpiece.

For example, as illustrated in (A) of FIG. 1, when a solid-shaped workpiece such as a drive shaft for automobiles is transferred, it is appropriate to select a fork-shaped hand for sandwiching the workpiece. In this case, by teaching a combination of the fork-shaped hand and the form data of this workpiece in advance, the hand can be selected automatically.

For example, as illustrated in (B) of FIG. 1, when a planar workpiece such as a retort pouch is transferred, it is appropriate to select a suction-type hand. In this case, by teaching a combination of the suction-type hand and the form data of this workpiece in advance, the hand can be selected automatically. In this manner, if a transfer target workpiece is an industrial product having a fixed shape, by teaching a combination of a hand to be used for transferring and the shape data of the transfer target workpiece in advance, a hand for transferring the workpiece can be selected.

However, the transfer target workpiece is not always an industrial product having a fixed form. For example, as illustrated in (C) of FIG. 1, a transfer target workpiece may be a vegetable, a fruit, or the like. Since the form of a vegetable, a fruit, or the like varies from one to another unlike an industrial product, an individual difference in weight or shape is large and it is difficult to prepare form data. Even when the workpiece is an industrial product having a fixed shape, if there are a number of types of products, it is difficult to prepare the form data for all industrial products in advance. In such a case, the combination of the form data of a transfer target workpiece and a hand to be used for transferring the workpiece cannot be taught in advance.

Therefore, an object of the present invention is to provide a machine learning device, a robot system, and a machine learning method capable of enabling a hand for transferring a transfer target to be selected even when the combination of the transfer target and the hand is not taught.

(1) A machine learning device (for example, a machine learning device 10 to be described later) of the present invention includes: state observation means (for example, a state observation unit 11 to be described later) for acquiring at least a portion of image data obtained by imaging a transfer target (for example, a first transfer target 51 or a second transfer target 52 to be described later) as input data; label acquisition means (for example, a label acquisition unit 12 to be described later) for acquiring information related to grasping means (for example, a hand 41 to be described later) attached to a robot for transferring the transfer target as a label; and learning means (for example, a learning unit 13 to be described later) for performing supervised learning using a set of the input data acquired by the state observation means and the label acquired by the label acquisition means as teacher data to construct a learning model that outputs information related to the grasping means appropriate for the transferring.

(2) The machine learning device according to (1) may be configured such that the label acquisition means further acquires information indicating a position and an attitude at which the grasping means grasps the transfer target as the label.

(3) The machine learning device according to (1) or (2) may be configured such that the label acquisition means acquires information for identifying grasping means that succeeded in transferring the transfer target as the label.

(4) The machine learning device according to (3) may be configured such that the information for identifying the grasping means is a character or a number assigned to each of the grasping means or a combination thereof.

(5) The machine learning device according to (4) may further include output presentation means (for example, an output presenting unit 15 to be described later) for presenting identification information of grasping means for transferring a transfer target imaged with newly image data on the basis of the output of the learning model when the new image data is input to the constructed learning model.

(6) The machine learning device according to (1) or (2) may be configured such that the label acquisition means acquires physical information indicating physical features of the grasping means that succeeded in transferring the transfer target as the label.

(7) The machine learning device according to (6) may further include output presentation means for presenting physical information indicating physical features of grasping means for transferring a transfer target imaged with newly input image data on the basis of the output of the learning model when the image data is newly input to the constructed learning model.

(8) The machine learning device according to (1) or (2) may be configured such that the state observation means further acquires information for identifying grasping means attached to the robot in addition to the image data as the input data, and the label acquisition means acquires information indicating success/failure of transferring of the transfer target as the label.

(9) The machine learning device according to (8) may further include output presentation means (for example, an output presenting unit 15 to be described later) for presenting estimation information on the success/failure of transferring when grasping means corresponding to newly input identification information transfers a transfer target imaged in newly input image data on the basis of the output of the learning model when the image data and the identification information of the grasping means attached to the robot are newly input to the constructed learning model.

(10) A robot system of the present invention is a robot system including the machine learning device according to any one of (1) to (9), imaging means (for example, a visual sensor 30 to be described later), and a robot (for example, a robot 40 to be described later) having grasping means attached thereto, wherein the state observation means acquires image data generated by the imaging means imaging at least a portion of a transfer target provided in a transfer source as the input data, and the label acquisition means acquires information related to grasping means attached to the robot for transferring the transfer target as the label.

(11) A machine learning method according to the present invention is a machine learning method performed by a machine learning device (for example, a machine learning device 10 to be described later), including: a state observation step of acquiring at least a portion of image data obtained by imaging a transfer target (for example, a first transfer target 51 or a second transfer target 52 to be described later) as input data; a label acquisition step of acquiring information related to grasping means attached to a robot for transferring the transfer target as a label; and a learning step of performing supervised learning using a set of the input data acquired in the state observation step and the set of labels acquired in the label acquisition step as teacher data to construct a learning model that outputs information related to the grasping means appropriate for the transferring.

According to the present invention, a hand for transferring a transfer target can be selected even when the combination of the transfer target and the hand is not taught.

BRIEF DESCRIPTION OF THE DRAWINGS

FIG. 7 is a flowchart illustrating an operation when constructing a learning model according to a third embodiment of the present invention.

DETAILED DESCRIPTION OF THE INVENTION

Next, embodiments of the present invention will be described in detail with reference to the drawings.

Overview of Embodiments

Hereinafter, three embodiments including the first, second, and third embodiments will be described. These embodiments have the same basic configuration and are same in that machine learning is performed but are different in that the embodiments use different types of target information in machine learning. First, an overview of these three embodiments will be described.

In the first embodiment, machine learning is performed using at least a portion of an image of a transfer target workpiece as input data and using identification information for specifying a hand which actually could transfer this workpiece as a label. A learning model is constructed by this machine learning so that a hand corresponding to the transfer target workpiece can be selected using the learning model.

In the second embodiment, machine learning is performed using at least a portion of an image of a transfer target workpiece as input data and using physical information of a hand which actually could transfer this workpiece as a label. Here, the physical information of a hand is information indicating physical features of the hand such as a shape, a size, and a material of the hand, for example. A learning model is constructed by this machine learning so that the form data indicating the shape and the size of a hand corresponding to the transfer target workpiece can be output using the learning model.

In the third embodiment, machine learning is performed using at least a portion of an image of a transfer target workpiece and identification information or physical information for specifying a hand that actually tries to transfer this workpiece as input data and using the success/failure result of actually trying transferring of this workpiece as a label. A learning model constructed by this machine learning is used so that success/failure by the combination of the transfer target workpiece and the hand that performs transferring can be determined.

In this manner, the respective embodiments construct a learning model by performing machine learning. In the respective embodiments, a hand for transferring a transfer target can be selected using the constructed learning model even when the form data of the transfer target is not taught. An overview of the three embodiments has been described. Next, the details of the respective embodiments will be described. Redundant description of the same portions of the respective embodiments will be omitted.

First Embodiment

Figure 1:
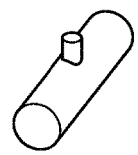
FIG. 1 is a schematic diagram for describing selection of a hand appropriate for a workpiece.
Figure 1:
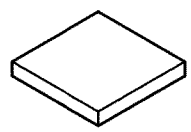
Figure 1:
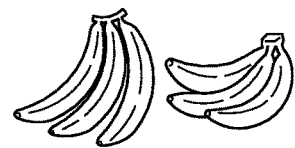
Figure 1:
Figure 1:
Figure 1:
Figure 1:
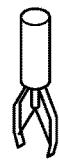
Figure 1:
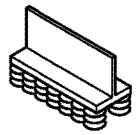
Figure 1:
Figure 2:
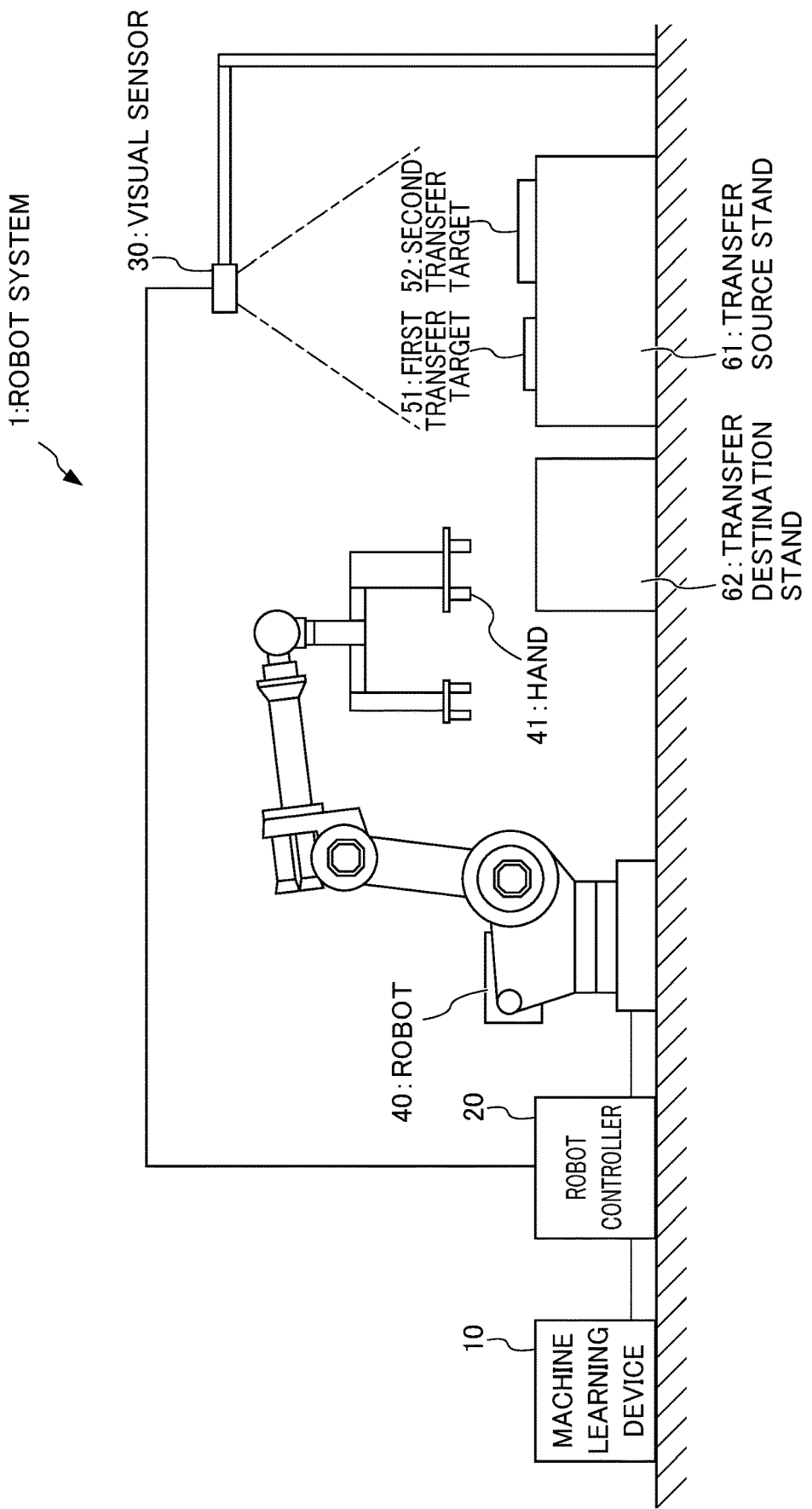
FIG. 2 is a schematic diagram illustrating a configuration of an embodiment of the present invention.

By referring to FIG. 2, a configuration of a robot system 1 according to the present embodiment will be described. The robot system 1 includes a machine learning device 10, a robot controller 20, a visual sensor 30, a robot 40, hands 41, a first transfer target 51, a second transfer target 52, a transfer source stand 61, and a transfer destination stand 62. Identification information (for example, a character such as the alphabet such as A and B, a number such as 100 and 200, or a combination thereof) is assigned to the individual hands.

In the present embodiment, the robot 40 transfers planar transfer targets (corresponding to the first transfer target 51 and the second transfer target 52) from the transfer source stand 61 to the transfer destination stand 62. Here, the individual transfer targets have different sizes. For example, the second transfer target 52 is larger than the first transfer target 51. Due to this, it is necessary to select the hand 41 appropriate for the size of the transfer target. Therefore, in the present embodiment, machine learning is performed so that the hand 41 appropriate for the size of the transfer target can be selected among a plurality of types of hands 41 which can transfer targets having different sizes. The individual transfer targets may have different shapes as well as the sizes.

The machine learning device 10 is a device that performs the above-described machine learning. The details of the machine learning device 10 will be described later by referring to the functional block diagram of FIG. 3.

The robot controller 20 is a device for controlling the operation of the robot 40. The robot controller 20 generates a signal for controlling the operation of the robot 40 on the basis of an operation program for causing the robot 40 to perform a predetermined operation. The robot controller 20 outputs the generated signal to the robot 40. The robot 40 drives a movable part such as an arm of the robot 40 and the hand 41 attached to the arm. In this way, the robot 40 can perform a predetermined operation. In the present embodiment, the robot 40 transfers the first transfer target 51 or the second transfer target 52 from the transfer source stand 61 to the transfer destination stand 62 as the predetermined operation, for example.

The robot controller 20 acquires image data (hereinafter referred to as "transfer target image data") obtained by imaging at least a portion of the transfer target from the visual sensor 30. The robot controller 20 specifies the position, the attitude, and the loading state of the transfer target by performing image analysis on the transfer target image data. For example, when the transfer target image data is a density image, image analysis is performed by extracting edge points which are points where a luminance change on an image is large. As a method for performing such image analysis, generalized Hough transform or the like can be used, for example. The robot controller 20 controls the robot 40 on the basis of the position, the attitude, and the loading state of the transfer target specified by image analysis to perform transferring.

The robot controller 20 and the machine learning device 10 are communicably connected. The robot controller 20 transmits various pieces of information to be used for machine learning to the machine learning device 10. For example, the robot controller 20 transmits the transfer target image data, the information for identifying the hand 41 used for transferring, and information indicating the success/failure of the transferring as the information to be used for machine learning. The details of the machine learning which uses these pieces of information will be described later.

The visual sensor 30 is a visual sensor that images transfer target image data. The visual sensor 30 is provided at a position at which the visual sensor 30 can image at least a portion of a transfer target on the transfer source stand 61. The visual sensor 30 may be provided in a movable part such as an arm of the robot 40.

The visual sensor 30 includes a camera such as a charge-coupled device (CCD) camera or a complementary metal oxide semiconductor (CMOS) camera in order to image at least a portion of a transfer target. The transfer target image data imaged by these cameras may be a two-dimensional color image, a two-dimensional grayscale image, a distance image, or a three-dimensional point group. The transfer target image data imaged by the visual sensor 30 is output to the robot controller 20.

The robot 40 is a robot that operates on the basis of the control of the robot controller 20. The robot 40 includes a base part for rotating about a vertical shaft and an arm that moves and rotates. The hand 41 for grasping a transfer target is attached to this arm. Since a specific configuration of the robot 40 and the hand 41 is well known to those skilled in the art, the detailed description thereof will be omitted.

Figure 3:
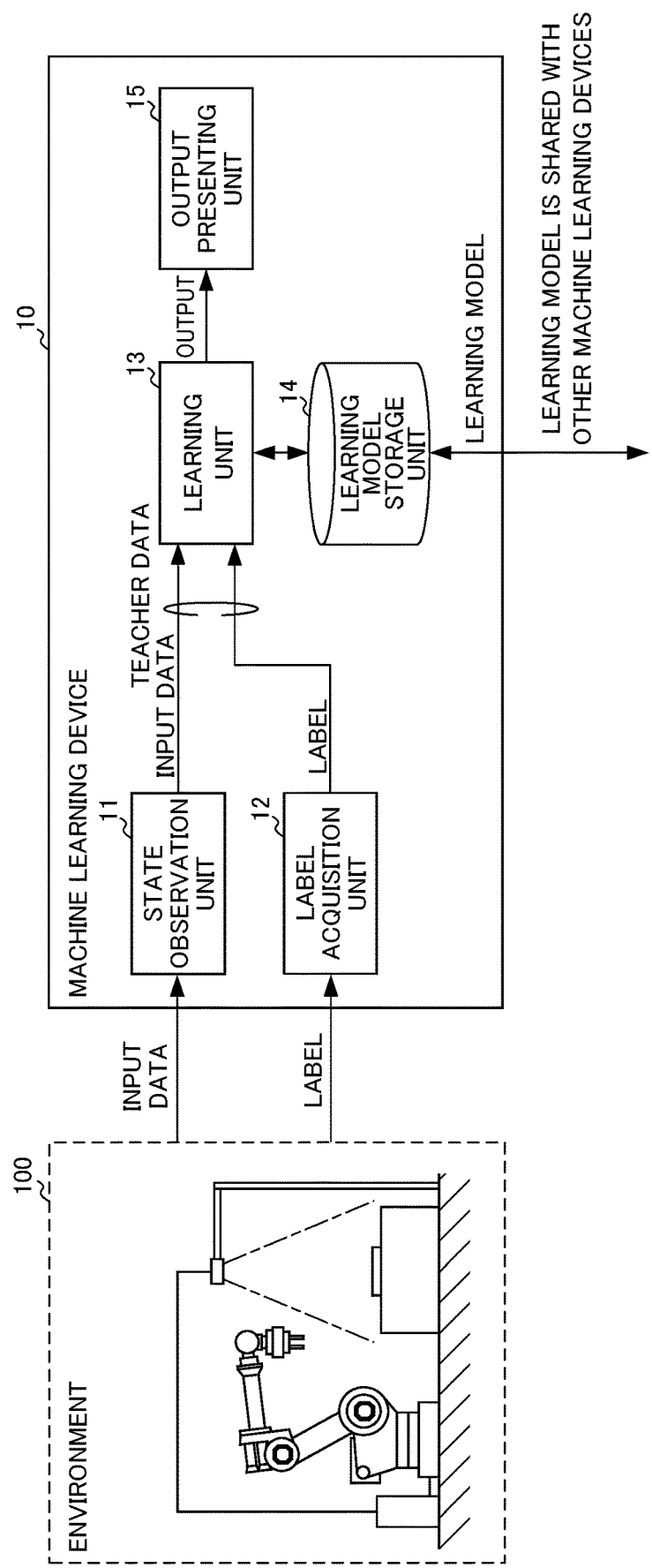
FIG. 3 is a block diagram illustrating a functional block of a machine learning device according to the embodiment of the present invention.

Next, the respective functional blocks included in the machine learning device 10 will be described with reference to FIG. 3. In FIG. 3, the constituent elements other than the machine learning device 10, of the robot system 1 illustrated in FIG. 2 are collectively illustrated as an environment 100.

The machine learning device 10 performs machine learning using the transfer target image data as input data and using the identification information for specifying the hand 41 which actually could transfer the transfer target as a label. A learning model is constructed by this machine learning so that a hand corresponding to the transfer target workpiece can be selected using the learning model.

In order to construct such a learning model, the machine learning device 10 includes a state observation unit 11, a label acquisition unit 12, a learning unit 13, a learning model storage unit 14, and an output presenting unit 15.

The state observation unit 11 is a unit that acquires input data from the robot controller 20 included in the environment 100 and outputs the acquired input data to the learning unit 13. Here, the input data in the present embodiment is transfer target image data as described above. The state observation unit 11 may be configured to output the entire portion of the acquired one piece of transfer target image data to the learning unit 13 as the input data and may output a portion of the acquired one piece of transfer target image data to the learning unit 13 as the input data. That is, the state observation unit 11 may be configured to output at least a portion of the acquired one piece of transfer target image data. For example, the state observation unit 11 detects a portion in which at least a portion of the transfer target is imaged from an image corresponding to the transfer target image data by performing image analysis. The state observation unit 11 may be configured to trim only the detected portion in which at least a portion of the transfer target is imaged and may be configured to output only the transfer target image data of the portion corresponding to the trimmed image to the learning unit 13 as the input data. In this way, since the transfer target can be specified more accurately, the accuracy of learning by the learning unit 13 can be enhanced.

The label acquisition unit 12 is a unit that acquires a label from the robot controller 20 included in the environment 100 and outputs the acquired label to the learning unit 13. Here, the label in the present embodiment is the identification information for specifying the hand 41 that actually succeeded in transferring the transfer target. The identification information is realized as a product number, an ID, or the like for identifying the hand 41, for example. More specifically, as described in the beginning of the description of the present embodiment, the identification information of the hand 41 is realized with a character such as the alphabet such as A and B, a number such as 100 and 200, or a combination thereof, for example. The identification information of the hand 41 is transmitted from the robot controller 20 that has confirmed the success in transferring the transfer target by performing image analysis on the image imaged by the visual sensor 30, for example, to the label acquisition unit 12.

The learning unit 13 receives a set of the input data and the label as teacher data and performs supervised learning using the teacher data to construct a learning model. For example, the learning unit 13 performs supervised learning using a neural network. In this case, the learning unit 13 performs forward propagation in which a set of the input data and the label included in the teacher data is supplied to a neural network configured by combining perceptrons, and the weighting factors for the respective perceptrons included in the neural network is changed such that the output of the neural network is the same as the label. For example, in the present embodiment, forward propagation is performed such that the identification information of the hand 41 that the neural network outputs is the same as the identification information of the hand 41 indicated by the label.

After performing forward propagation in this manner, the learning unit 13 adjusts the weighting values so that an error in the output of the respective perceptrons decreases by a method called back propagation (also referred to as backward propagation of errors). More specifically, the learning unit 13 calculates an error between the label and the output of the neural network and corrects the weighting values so that the calculated error decreases. In this manner, the learning unit 13 learns the features of the teacher data and recursively acquires a learning model for estimating the result from an input.

As described above, the learning unit 13 performs machine learning which uses the neural network using only the identification information of the hand 41 which has succeeded in the transferring as a label without using the identification information of the hand 41 that has failed in the transferring as a label. In this way, the learning unit 13 constructs a learning model that outputs the identification information of the hand 41 suitable for transferring a transfer target.

However, there is a case in which a plurality of hands 41 succeeds in transferring when the respective hands 41 tried to transfer one transfer target. In this case, a plurality of pieces of teacher data are generated such that different labels are made to form a set with the input data of one piece of transfer target image data corresponding to one transfer target. When machine learning is performed using the teacher data in which different labels are made to form a set with the input data, it is unclear whether it is appropriate to perform machine learning using which label as a correct answer and the machine learning may not be performed appropriately. Therefore, in the present embodiment, when the hand 41 succeeds in transferring, this transferring may be evaluated to calculate an evaluation value. The teacher data is generated using the identification information of the hand 41 that performed transferring of which the evaluation value is the highest as a label. In this way, the learning unit 13 can perform machine learning on the hand 41 having the highest evaluation value among the hands 41 that succeeded in transferring. Due to this, the learning unit 13 can construct a learning model that outputs the identification information of the optimal hand 41 which is thought to be best suitable for transferring a transfer target.

Although the criteria of evaluation are not particularly limited, for example, evaluation may be performed such that the shorter the required time for ending transferring after starting the transferring, the higher becomes the evaluation value. In addition to this, the evaluation value may increase further when the hand 41 could transfer a transfer target to a target position without an error. Evaluation may be performed according to criteria other than these criteria. Further, when evaluation values are calculated according to a plurality of criteria and the calculated evaluation values are added up, a weighting factor may be applied to the respective evaluation values for the criteria and then the weighted evaluation values may be added up. The evaluation value is calculated by the robot controller 20 measuring the time required for ending transferring on the basis of the control information of the arm and the hand 41 of the robot 40 and an image analysis result obtained by performing image analysis on the image imaged by the visual sensor 30, for example. An operation during machine learning including calculation of the evaluation value will be described later with reference to FIG. 4.

In the present embodiment, machine learning is performed using image data called transfer target image data as input data. Due to this, the learning unit 13 may perform machine learning using a convolutional neural network (CNN) which is a neural network suitable for learning directed to image data.

The convolutional neural network has a structure including a convolution layer, a pooling layer, a fully connected layer, and an output layer.

In the convolution layer, a filter having a predetermined parameter is applied to the input image data in order to perform feature extraction such as edge extraction. The predetermined parameter of this filter corresponds to a weighting factor of the neural network and is learnt by repeating forward propagation and back propagation.

In the pooling layer, an image output from the convolution layer is blurred in order to allow a positional shift of an object. In this way, even when the position of an output object varies from the position of an input object, the two objects can be regarded as the same object. By combining the convolution layer and the pooling layer, the feature amount can be extracted from an image.

In the fully connected layer, image data from which a feature portion is extracted through the convolution layer and the pooling layer is connected to one node, and a value converted by an activation function is output. Here, the activation function is a function that converts all output values smaller than 0 to 0 and is used for transmitting output values equal to or larger than a threshold to the output layer as meaningful information.

In the output layer, the output from the fully connected layer is converted to a probability using a Softmax function which is a function for performing multi-class classification, and the identification information of the hand 41 is output on the basis of this probability. Similarly to the neural network, forward propagation and back propagation are repeated so that an error between the output and the label decreases. The learning unit 13 constructs a learning model by performing machine learning using the neural network having the above-described configuration.

The supervised learning which uses the above-mentioned neural network is an example of supervised learning, and the learning unit 13 may perform supervised learning which uses a hidden Markov model, for example.

The learning model constructed by the learning unit 13 is output to the learning model storage unit 14 and the output presenting unit 15 to be described later.

The learning model storage unit 14 is a storage unit that stores the learning model constructed by the learning unit 13. When new teacher data is acquired after a learning model is constructed, supervised learning is performed again on the learning model stored in the learning model storage unit 14 whereby the constructed learning model is updated appropriately.

The learning model stored in the learning model storage unit 14 may be shared with other machine learning devices 10. When the learning model is shared by a plurality of machine learning devices 10, since supervised learning can be performed by the respective machine learning device 10 in a distributed manner, the efficiency of supervised learning can be improved.

The output presenting unit 15 is a unit that presents the output of the learning unit 13. As described above, in the present embodiment, since the identification information of the hand 41 suitable for transferring a transfer target can be output by the learning model constructed by the learning unit 13, the output presenting unit 15 presents the output to a user by displaying the content of the output of the learning unit 13 on a screen, for example.

The output presenting unit 15 may be configured to transmit the content of the output of the learning unit 13 to the robot controller 20 included in the machine learning device 10. The robot controller 20 having received the output may be configured to present the output to the user by displaying the content of the output on a screen, for example. Further, when a device for automatically replacing the hands 41 is included in the robot system 1, the label acquisition unit 12 may be configured to transmit the content of the output of the learning unit 13 to the automatic replacement device. In this way, the user or the device who or that replaces the hand 41 can replace the hand with the hand 41 suitable for the transfer target.

Hereinabove, the functional blocks included in the machine learning device 10 have been described. In order to realize these functional blocks, the machine learning device 10 includes an arithmetic processing unit such as a central processing unit (CPU). The machine learning device 10 further includes an auxiliary storage device such as a hard disk drive storing various control programs such as application software or an operating system (OS) and a main storage device such as a random access memory (RAM) for storing data temporarily required for the arithmetic processing unit to execute a program.

In the machine learning device 10, the arithmetic processing device reads application software and an OS from the auxiliary storage device and performs arithmetic processing on the basis of the read application and OS while developing the read application software and OS into the main storage device. Various hardware components included in the respective devices are controlled on the basis of the arithmetic processing result. In this way, the functional blocks of the present embodiment are realized. That is, the present embodiment can be realized by cooperation of hardware and software.

As a specific example, the machine learning device 10 can be realized by incorporating application software for realizing the present embodiment into a general personal computer. However, since the machine learning device 10 involves a large amount of computation associated supervised learning, the processing can be accelerated, for example, by mounting graphics processing units on a personal computer and using the GPUs for the arithmetic processing associated with supervised learning by a technique called general-purpose computing on graphics processing units (GPGPU). In order to further accelerate the processing, a computer cluster may be constructed using a plurality of computers having such a GPU mounted thereon and parallel processing may be performed using a plurality of computers included in this computer cluster.

Next, an operation during supervised learning, performed by the machine learning device 10 will be described with reference to the flowchart of FIG. 3. In step S11, the robot controller 20 selects one transfer target. For example, either one of the first transfer target 51 or the second transfer target 52 illustrated in FIG. 2 is selected. The transfer target is selected by specifying a transfer target at such position and attitude that the transfer target can be grasped on the basis of the analysis result of the transfer target image data acquired from the visual sensor 30, for example. The transfer target may be selected on the basis of an operation of a user.

In step S12, the robot controller 20 stores transfer target image data to be used for input data of the machine learning.

In step S13, the robot controller 20 selects one hand 41 to be attached to the robot 40. The hand 41 may be selected randomly from the selectable hands 41 by the robot controller 20 and may be selected on the basis of a user's operation. The selected hand 41 is attached to the arm of the robot 40 by a user or a device who or that automatically replaces the hand 41.

In step S14, the robot controller 20 tries to transfer a transfer target by controlling the arm of the robot 40 and the hand 41 presently attached to the arm of the robot 40.

In step S15, the robot controller 20 determines whether the hand 41 succeeded in the transferring tried in step S14.

When the hand 41 succeeded in the transferring, a determination result of Yes is obtained in step S16, and the processing proceeds to step S17. In step S17, the robot controller 20 calculates an evaluation value and stores the calculated evaluation value in correlation with the identification information of the hand 41 that has succeeded in the transferring. A method of calculating the evaluation value is as described above.

On the other hand, when the hand 41 failed in the transferring, a determination result of No is obtained in step S16, the processing proceeds to step S18. This is because, as described above, the learning unit 13 uses only the identification information of the hand 41 which has succeeded in the transferring as a label without using the identification information of the hand 41 that has failed in the transferring as a label. When a determination result of No is obtained in step S16, the input data acquired in step S12 of the present process is not used as the teacher data. Therefore, the robot controller 20 discards this input data.

In step S18, the robot controller 20 determines whether the hand 41 is to be replaced with a new hand. When the hand 41 to be used for a learning target is present for the transfer target selected in step S11, a determination result of Yes is obtained in step S18, and the processing returns to step S13. The processes subsequent to step S13 are performed again. On the other hand, when a hand to be used for a learning target is not present, a determination result of No is obtained in step S18, and the processing proceeds to step S19.

In step S19, the robot controller 20 compares the evaluation values correlated with the respective pieces of identification information of the hands 41 that have succeeded in the transferring, stored in step S17. The identification information of the hand 41 correlated with the highest evaluation value is transmitted to the machine learning device 10 as a label. The label acquisition unit 12 of the machine learning device 10 acquires this label. The robot controller 20 transmits the transfer target image data stored in step S12 to the machine learning device 10 as input data. The state observation unit 11 of the machine learning device 10 acquires the input data. In this way, the robot controller 20 obtains one piece of teacher data.

In step S20, the robot controller 20 determines whether the transfer target is to be changed. When a transfer target to be used as a learning target is present, a determination result of Yes is obtained in step S20 and the processing returns to step S11. A new transfer target is selected in step S11 and the subsequent processing is performed again. On the other hand, when a transfer target to be used for a learning target is not present, a determination result of No is obtained in step S20 and the processing proceeds to step S21.

In step S21, the learning unit 13 executes supervised learning on the basis of teacher data including a label and the transfer target image data acquired in step S19. A method of supervised learning is the same as that described for the learning unit 13. The supervised learning is repeated until predetermined conditions are satisfied. For example, learning ends on conditions that an error between the label and the output of the neural network is equal to or smaller than a predetermined value and supervised learning is repeated for predetermined times, and when these conditions are satisfied.

In step S22, the learning unit 13 stores the learning model constructed by the learning in step S21 in the learning model storage unit 14. With the above-described operation, the learning unit 13 can construct a learning model that outputs the identification information of the hand 41 suitable for transferring the transfer target.

The above-described operation may be performed as processing for constructing a learning model and may be performed when the robot 40 operates normally in a plant or the like.

Although the above-described supervised learning is performed by batch learning after teacher data for a plurality of transfer targets is accumulated, the supervised learning may be performed by online learning or mini-batch learning. Online learning is a learning method in which supervised learning is performed immediately whenever the machine learning device 10 performs processing to create teacher data. Batch learning is a learning method in which a plurality of pieces of teacher data are collected while the machine learning device 10 is processed repeatedly to create teacher data and supervised learning is performed using all pieces of collected teacher data. Further, mini-batch learning is a learning method which is halfway between online learning and batch learning and in which supervised learning is performed whenever a certain number of pieces of teacher data are accumulated.

Figure 5:
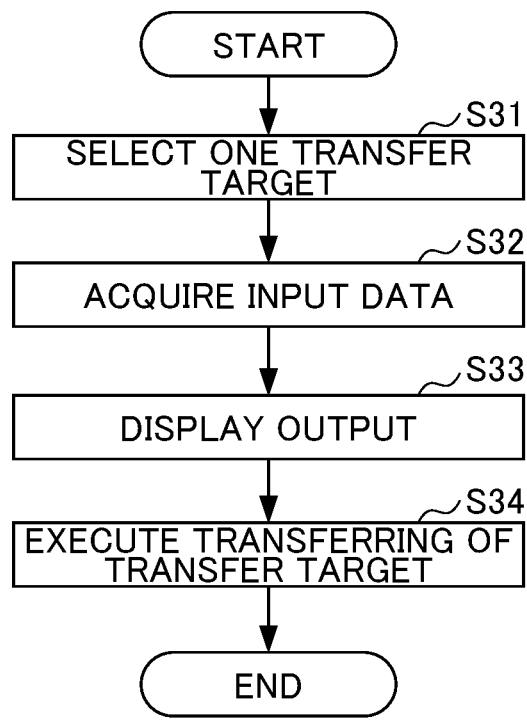
FIG. 5 is a flowchart illustrating an operation when using the learning model according to the embodiment of the present invention.

Next, an operation when using the learning model constructed in this manner will be described with reference to the flowchart of FIG. 5. In step S31, the robot controller 20 selects one transfer target. For example, either one of the first transfer target 51 or the second transfer target 52 illustrated in FIG. 2 is selected. The transfer target is selected by specifying a transfer target at such position and attitude that the transfer target can be grasped on the basis of the analysis result of the transfer target image data acquired from the visual sensor 30, for example. The transfer target may be selected on the basis of an operation of a user.

In step S32, the robot controller 20 transmits the transfer target image data to the machine learning device 10. The machine learning device 10 acquires the received transfer target image data as the input data of the constructed learning model.

In step S33, in the machine learning device 10, the input data acquired in step S32 is input to the learning model of the learning unit 13. The identification information of the hand 41 suitable for transferring the transfer target is output from the learning model of the learning unit 13 to the output presenting unit 15. The output presenting unit 15 outputs the identification information of the hand 41 to a user or a device who or that automatically replaces the hands 41 included in the environment 100. When the identification information is output to the user, the output presenting unit 15 transmits the identification information of one hand 41 to the robot controller 20, for example. The received identification information of the hand 41 is displayed on a display unit (not illustrated) included in the robot controller 20.

In step S34, the user or the device who or that automatically replaces the hand 41 and has been presented with the identification information of the hand 41 attaches the hand 41 corresponding to the identification information to the arm of the robot 40. The robot controller 20 drives the arm of the robot 40 and the hand 41 attached to the arm to transfer the transfer target.

With the above-described operation, transferring can be performed by the hand 41 suitable for transferring the transfer target. Here, in the present embodiment, since the learning model constructed by the machine learning is used, the hand 41 suitable for transferring an unknown transfer target can be presented. That is, a hand for transferring a transfer target of which the combination with a hand is not taught can be selected. In this way, since a hand suitable for transferring workpieces of which the individual difference in weight and shape is large and of which the form data is difficult to be taught in advance can be selected automatically, the rate of failure in transferring can be decreased. Moreover, the number of steps necessary for hand replacement can be reduced.

Second Embodiment

Hereinabove, the first embodiment has been described. Next, the second embodiment will be described. Since the second embodiment has the same basic configuration and performs the same operation as those of the first embodiment, the redundant description thereof will be omitted.

The information to be used as a label in the machine learning in the second embodiment is different from that of the first embodiment. In the first embodiment, the identification information of the hand 41 that succeeded in transferring is used as a label. In contrast, in the second embodiment, the physical information of the hand 41 that succeeded in transferring is used as a label. Here, the physical information of the hand 41 is information indicating physical features of a hand and is information indicating the physical features of the hand 41 such as the shape, the size, and the material of the hand 41, for example. The input data is the transfer target image data similarly to the first embodiment.

In the present embodiment, parameters for specifying the shape and the size using a computer-aided design (CAD), for example, is used as the physical information of the hand 41. For example, parameters indicating the shape of the hand 41, the dimensions of respective portions of the hand 41, and the like are used. In this case, rather than using the shape itself of the hand 41 as the parameters, the shape of the hand 41 may be defined for respective types of hands in advance, and parameters designating the defined shape types may be used. The shape type includes, for example, a hand that sandwiches a transfer target from the outer side, a hand that sandwiches a transfer target from the inner side, a hand that adsorbs a transfer target by vacuum suction, and a hand that adsorbs a transfer target by static electricity. Moreover, the number of fingers that sandwich a transfer target and the number of parts that adsorb a transfer target may be defined as a portion of the type.

Figure 4:
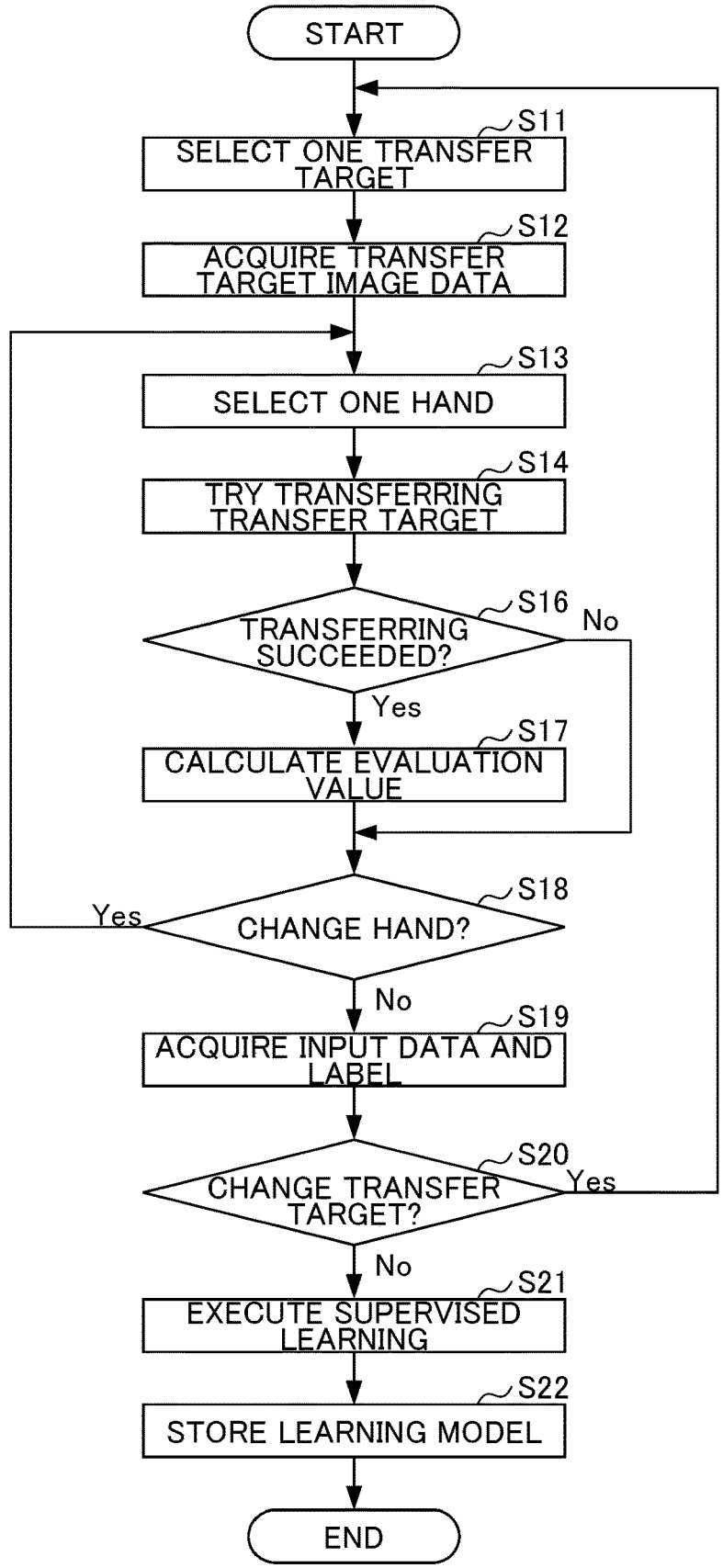
FIG. 4 is a flowchart illustrating an operation when constructing a learning model according to the embodiment of the present invention.

Processing of constructing the learning model described with reference to FIG. 4 is performed using the physical information of the hand 41 as a label and using the transfer target image data as the input data. In this way, in the present embodiment, a learning model that outputs data that specifies the physical information of the hand 41 suitable for transferring the transfer target can be constructed.

Figure 6A:
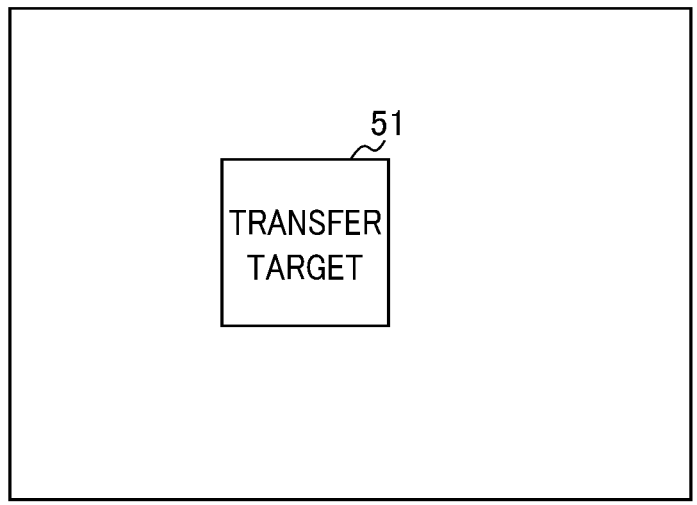
FIG. 6A is a diagram illustrating an image of an input image according to a second embodiment of the present invention.
Figure 6B:
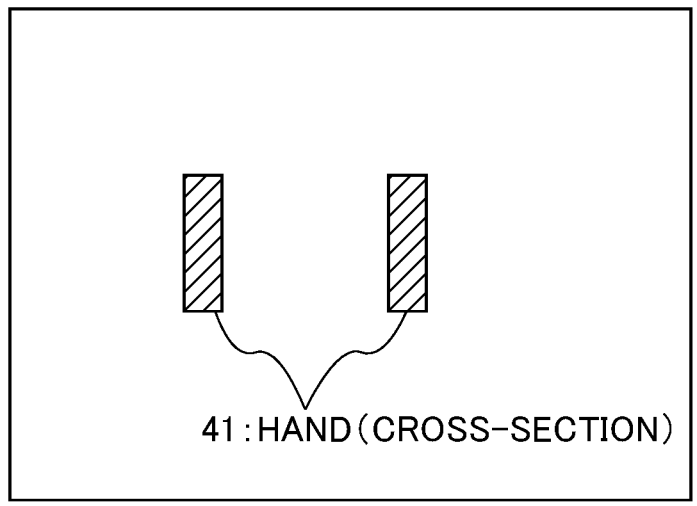
FIG. 6B is a diagram illustrating an image of a cross-sectional image of a hand according to the second embodiment of the present invention.

Next, how the learning model constructed in this manner is used will be described with reference to the flowchart of FIG. 5 and the images illustrated in FIGS. 6A and 6B. The operations in the flowchart of FIG. 5 are the same as those described in the first embodiment, and the redundant description thereof will be omitted.

In step S31, the robot controller 20 selects one transfer target. In step S32, the robot controller 20 transmits transfer target image data to the machine learning device 10. The machine learning device 10 acquires the received transfer target image data as the input data of the constructed learning model. Here, the transfer target image data used as the input data is schematically illustrated in FIG. 6A. FIG. 6A illustrates a transfer target 51.

In step S33, in the machine learning device 10, the input data acquired in step S32 is input to the learning model of the learning unit 13. The identification information of the hand 41 suitable for transferring the transfer target is output from the learning model of the learning unit 13 to the output presenting unit 15. The output presenting unit 15 transmits CAD parameters which are the physical information of the hand 41 to a device (not illustrated) having the CAD mounted thereon. The device having the CAD mounted thereon displays the shape and the size of the hand 41 on the basis of the CAD parameters which are the physical information of the hand 41. For example, as illustrated in FIG. 6B, a cross-sectional image illustrating a state in which the hand 41 grasps a workpiece is displayed. The shape and the size are suitable for grasping the transfer target 51 illustrated in FIG. 6A.

A user who refers to this display can select an appropriate hand 41 on the basis of the shape and the size, for example. When the hand 41 corresponding to the shape and the size is not present, the user understands that a hand having this shape and size may be designed. That is, the present embodiment can be used effectively in a scene and the like in which a hand 41 suitable for a transfer target is designed. In this case, rather than actually performing transferring to generate input data and labels, simulation may be performed on a computer to generate input data and labels.

In step S34, the user attaches the hand 41 created by designing to the arm of the robot 40. The robot controller 20 drives the arm of the robot 40 and the hand 41 attached to the arm to transfer the transfer target.

With the above-described operation, transferring can be performed by the hand 41 suitable for transferring the transfer target. Here, in the present embodiment, since the learning model constructed by the machine learning is used, the shape and the size of the hand 41 suitable for transferring even an unknown transfer target can be presented. That is, a hand for transferring a transfer target of which the combination with a hand is not taught can be selected.

Third Embodiment

Next, the third embodiment will be described. Since the third embodiment has the same basic configuration and performs the same operation as those of the above-described embodiments, the redundant description thereof will be omitted.

The information to be used as the input data and the information to be used as a label in the machine learning in the third embodiment are different from those of the above-described embodiments. Here, in the above-described embodiments, the transfer target image data is used as the input data. In the first embodiment, the identification information of the hand 41 that succeeded in transferring is used as a label. Further in the second embodiment, the physical information of the hand 41 that succeeded in transferring is used as a label. In contrast, in the present embodiment, a combination of the transfer target image data and the identification information or the physical information of the hand 41 that tries to transfer a transfer target are used as input data. In the present embodiment, information indicating whether tried transferring is succeeded or failed (that is, information indicating the success/failure of transferring) is used as a label. In this manner, in the above-described embodiments are different in that machine learning is performed using only the information obtained when a hand succeeded in transferring as teacher data, whereas in the present embodiment, the machine learning is performed using both the information obtained when a hand succeeded in transferring and the information obtained when a hand failed in transferring as teacher data regardless of the success/failure of the transferring.

In this manner, the processing of constructing a learning model described with reference to FIG. 4 is performed using a combination of the transfer target image data and the identification information or the physical information of the hand 41 that tries to transfer a transfer target as input data and using information indicating the success/failure of the transferring as a label. In this way, in the present embodiment, when a combination of the transfer target image data and the identification information or the physical information of the hand 41 that tries to transfer a transfer target is input, a learning model that outputs an estimation result of the success/failure of the transferring with this combination can be constructed. In the present embodiment, information is used as teacher data regardless of the success/failure of the transferring. In the present embodiment, information is also used as teacher data regardless of the evaluation value. Due to this, the processes of steps S16 and S17 in FIG. 4 are omitted.

Next, how the learning model constructed in this manner is used will be described with reference to the flowchart of FIG. 5. The operations in the flowchart of FIG. 5 are the same as those described in the respective embodiments, and the redundant description thereof will be omitted.

In step S31, the robot controller 20 selects one transfer target. In step S32, the robot controller 20 transmits a combination of the transfer target image data and the identification information or the physical information of the hand 41 that tries to transfer a transfer target to the machine learning device 10. The machine learning device 10 acquires the received combination of the transfer target image data and the identification information or the physical information as the input data of the constructed learning model.

In step S33, in the machine learning device 10, the input data acquired in step S32 is input to the learning model of the learning unit 13. The estimation result of the success/failure of transferring with the combination in the input data is output from the learning model of the learning unit 13 to the output presenting unit 15. The output presenting unit 15 outputs the estimation result of the success/failure of the transferring to the user included in the environment 100. For example, the identification information or the physical information of the hand 41 is transmitted to the robot controller 20. The estimation result of the success/failure of the transferring is displayed by the robot controller 20 on a display unit (not illustrated) included in the robot controller 20. Here, when the presented estimation result of the success/failure presented indicates that the hand is estimated to be failed in the transferring, the user performs steps S32 and S33 again using the identification information or the physical information of another hand 41 different from the hand 41 used as the input data in step S32 as input data.

In step S34, when the estimation result indicates that the hand is estimated to be succeeded in the transferring, the user attaches the hand 41 corresponding to the identification information or the physical information of the hand 41 used as the input data in step S32 to the arm of the robot 40. The robot controller 20 drives the arm of the robot 40 and the hand 41 attached to the arm to transfer the transfer target.

With the above-described operation, transferring can be performed by the hand 41 suitable for transferring the transfer target. Here, in the present embodiment, since the learning model constructed by the machine learning is used, the estimation result on whether the hand 41 succeeded in transferring even an unknown transfer target can be presented. That is, a hand for transferring a transfer target of which the combination with a hand is not taught can be selected.

<Cooperation of Hardware and Software>

The respective devices included in the robot system may be realized by hardware, software, or a combination thereof. The machine learning method performed by cooperation of the respective devices included in the robot system may be realized by hardware, software, or a combination thereof. Here, being realized by software means that a computer reads and executes a program whereby the device or the method is realized.

The programs can be stored using various types of non-transitory computer readable media and be supplied to a computer. The non-transitory computer readable media include various types of tangible storage media. Examples of the non-transitory computer readable media include a magnetic recording medium (for example, a flexible disk, magnetic tape, or a hard disk drive), a magneto-optical recording medium (for example, a magneto-optical disk), a CD read only memory (CD-ROM), a CD-R, a CD-R/W, and a semiconductor memory (for example, a mask ROM, a programmable ROM (PROM), an erasable PROM (EPROM), a flash ROM, or a random access memory (RAM)). Moreover, the programs may be supplied to a computer in a form of various types of transitory computer readable media. Examples of transitory computer readable media include electrical signals, optical signals, and electromagnetic waves. The transitory computer readable media can supply programs to a computer via a wired communication path such as an electric wire and an optical fiber or a wireless communication path.

Modification of Embodiment

The above-described embodiments are preferred embodiments of the present invention. However, the scope of the present invention is not limited to only the embodiments but the respective embodiments may be combined and the present invention may be embodied in various modifications without departing from the spirit of the present invention.

Modification to Label

In the first embodiment, the identification information for specifying the hand 41 that actually succeeded in transferring a transfer target is used as the label. In the second embodiment, the physical information indicating the physical features of the hand 41 is used as the label. In the third embodiment, the success/failure result of actually trying the transferring of a workpiece by the hand 41 is used as the label. In these embodiments, further, the grasping position and the grasping attitude of the transfer target by the hand 41 may be included as the label when the hand 41 actually tried to transfer a transfer target.

In this way, in the first and second embodiments, a learning model can be constructed by performing machine learning using the grasping position and the grasping attitude when a hand actually succeeded in transferring. By using this learning model, it is possible to automatically select the hand 41 to be used for transferring and to automatically determine how should the hand 41 grasp a transfer target to succeed in transferring. By doing so, the convenience can be improved further.

In the third embodiment, a learning model can be constructed by performing machine learning using the grasping position and the grasping attitude when a hand actually succeeded in transferring and the grasping position and the grasping attitude when a hand actually failed in transferring. By using this learning model, it is possible to automatically select the hand 41 to be used for transferring and to automatically determine how should the hand 41 grasp a transfer target to succeed in transferring. By doing so, the convenience can be improved further.

Modification to Operation During Learning

In the first and second embodiments, as described with reference to FIG. 4, when a plurality of hands 41 succeeded in transferring, the teacher data is generated using the identification information of the hand 41 that performed transferring with the highest evaluation value as a label. In this modification, a machine learning operation is simplified by omitting this evaluation. In the respective embodiments, when a hand succeeded in transferring as illustrated in FIG. 4, the evaluation value is calculated in step S17, and then, the hand is replaced with another hand 41 to repeatedly try the transferring. Due to this, in the respective embodiments, a plurality of hands 41 that succeeded in transferring are present for one transfer target. Thus, the evaluation values are compared to select one hand 41 and the identification information of this hand 41 is used as a label.

In contrast, in this modification, as illustrated in FIG. 7, when any one hand 41 succeeds in transferring one transfer target, the processing of step S19 is performed without trying the transferring by another hand 41. That is, in this modification, one hand 41 having succeeded in transferring is present for one transfer target. Due to this, the identification information of the hand 41 is used as a label without comparing the evaluation values. In this way, one piece of teacher data can be created for one transfer target, and machine learning can be performed similarly to the respective embodiments. In this modification, when a hand fails in transferring, a determination result of No is obtained in step S16 and it is determined in step S18 whether the hand is to be replaced similarly to the respective embodiments and a transferring is tried by another hand 41. Due to this, when any one hand 41 succeeds in transferring, teacher data can be created.

Other Modifications

In the respective embodiments, although the machine learning device 10 and the robot controller 20 are configured as separate devices, these devices may be realized as an integrated device. In the above-described embodiments, although the robot controller 20 and the machine learning device 10 are illustrated as being disposed close to each other, these devices may be positioned distant from each other via a network such as a local area network (LAN) or the Internet. One machine learning device 10 may be connected to a plurality of robot controllers 20. One machine learning device 10 may perform machine learning on the basis of pieces of teacher data acquired from the plurality of robot controllers 20.

In the above-described embodiments, although the transfer target image data of one image is used as the input data of one piece of teacher data, the transfer target image data of a plurality of images may be used as the input data of one piece of teacher data.

EXPLANATION OF REFERENCE NUMERALS

1: Robot system
10: Machine learning device
11: State observation unit
12: Label acquisition unit
13: Learning unit
14: Learning model storage unit
15: Output presenting unit
20: Robot controller
30: Visual sensor
40: Robot
41: Hand
51: First transfer target
52: Second transfer target
61: Transfer source stand
62: Transfer destination stand

What is claimed is:

1. A machine learning device comprising:
state observation means for acquiring at least a portion of image data obtained by imaging a transfer target as input data;
label acquisition means for acquiring information for identifying grasping means that has succeeded in transferring the transfer target as a label, the grasping means being attached to a robot for transferring the transfer target; and
learning means for performing supervised learning using a set of the input data acquired by the state observation means and the label acquired by the label acquisition means as teacher data to construct a learning model that outputs information for identifying the grasping means appropriate for the transferring,
wherein the learning model is a learning model that uses at least a portion of image data obtained by imaging any transfer target as input data, and the information for identifying the grasping means appropriate for transferring the transfer target as output data.

2. The machine learning device according to claim 1, wherein
the label acquisition means further acquires information indicating a position and an attitude at which the grasping means grasps the transfer target as the label.

3. The machine learning device according to claim 1, wherein
the information for identifying the grasping means is a character or a number assigned to each of the grasping means or a combination thereof.

4. The machine learning device according to claim 3, further comprising:
output presentation means for presenting identification information of grasping means for transferring a transfer target imaged with newly input image data on the basis of the output of the learning model when the image data is newly input to the constructed learning model.

5. A robot system comprising the machine learning device according to claim 1, imaging means, and the robot having the grasping means attached thereto, wherein
the state observation means acquires image data generated by the imaging means imaging at least a portion of a transfer target provided in a transfer source as input data, and
the label acquisition means acquires information for identifying the grasping means attached to the robot for transferring the transfer target as a label.

6. A machine learning device comprising:
state observation means for acquiring at least a portion of image data obtained by imaging a transfer target as input data;
label acquisition means for acquiring physical information indicating physical features of grasping means that has succeeded in transferring the transfer target as a label, the grasping means being attached to a robot for transferring the transfer target; and
learning means for performing supervised learning using a set of the input data acquired by the state observation means and the label acquired by the label acquisition means as teacher data to construct a learning model that outputs physical information indicating physical features of the grasping means appropriate for the transferring,
wherein the learning model is a learning model that uses at least a portion of image data obtained by imaging any transfer target as input data, and the physical information indicating physical features of the grasping means appropriate for transferring the transfer target as output data.

7. The machine learning device according to claim 6, further comprising:
output presentation means for presenting physical information indicating physical features of grasping means for transferring a transfer target imaged with newly input image data on the basis of the output of the learning model when the image data is newly input to the constructed learning model.

8. A robot system comprising a machine learning device according to claim 6, imaging means, and a robot having grasping means attached thereto,
wherein a state observation means acquires image data generated by the imaging means imaging at least a portion of a transfer target provided in a transfer source as an input data, and a label acquisition means acquires physical information indicating physical features of grasping means attached to the robot for transferring the transfer target as a label.

9. A machine learning device comprising:

state observation means for acquiring at least a portion of image data obtained by imaging a transfer target as input data, the state observation means being adapted to further acquire information for identifying grasping means attached to a robot in addition to the image data as the input data, label acquisition means for acquiring information indicating success/failure of transferring of the transfer target by the grasping means as a label, and learning means for performing supervised learning using a set of the input data acquired by the state observation means and the label acquired by the label acquisition means as teacher data to construct a learning model that outputs information for identifying the grasping means appropriate for the transferring, wherein the learning model is a learning model that uses at least a portion of image data obtained by imaging any transfer target, and the information for identifying the grasping means attached to a robot for transferring the transfer target as input data, and uses an estimation result related to success/failure of transferring of the transfer target by the grasping means as output data.

10. The machine learning device according to claim 9, further comprising:

output presentation means for presenting estimation information on the success/failure of transferring when grasping means corresponding to newly input identification information transfers a transfer target in newly input image data on the basis of the output of the learning model when the image data and the identification information of the grasping means attached to the robot are newly input to the constructed learning model.

11. A machine learning method performed by a machine learning device, comprising the steps of:

acquiring, by state observation means, at least a portion of image data obtained by imaging a transfer target as input data;

acquiring information, by label acquisition means, for identifying grasping means that has succeeded in transferring the transfer target as a label, the grasping means being attached to a robot for transferring the transfer target; and performing supervised learning using a set of the input data acquired by the state observation means and the label acquired by the label acquisition means as teacher data to construct a learning model that outputs information for identifying the grasping means appropriate for the transferring, wherein the learning model is a learning model that uses at least a portion of the image data obtained by imaging any transfer target as input data, and the information for identifying the grasping means appropriate for transferring the transfer target as output data.

* * * * *